March 24, 1931. W. M. HALLBAUER 1,797,609
MECHANICAL GUITAR PLAYER
Filed May 16, 1929 8 Sheets-Sheet 1

Inventor.
William M. Hallbauer

March 24, 1931.  W. M. HALLBAUER  1,797,609
MECHANICAL GUITAR PLAYER
Filed May 16, 1929  8 Sheets-Sheet 2
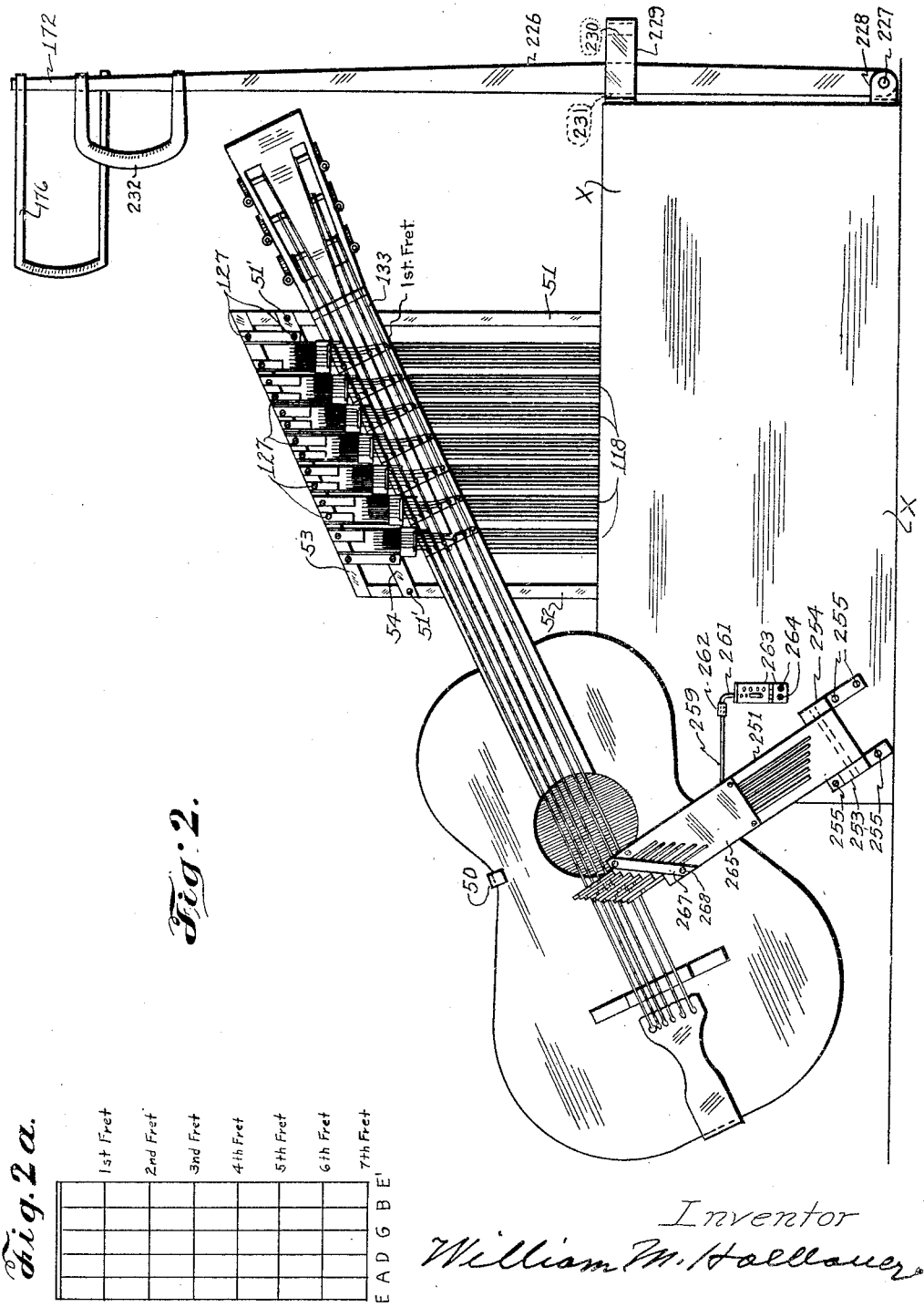
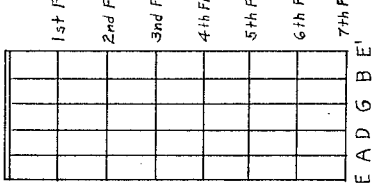
Inventor
William M. Hallbauer Inventor
William M. Hallbauer

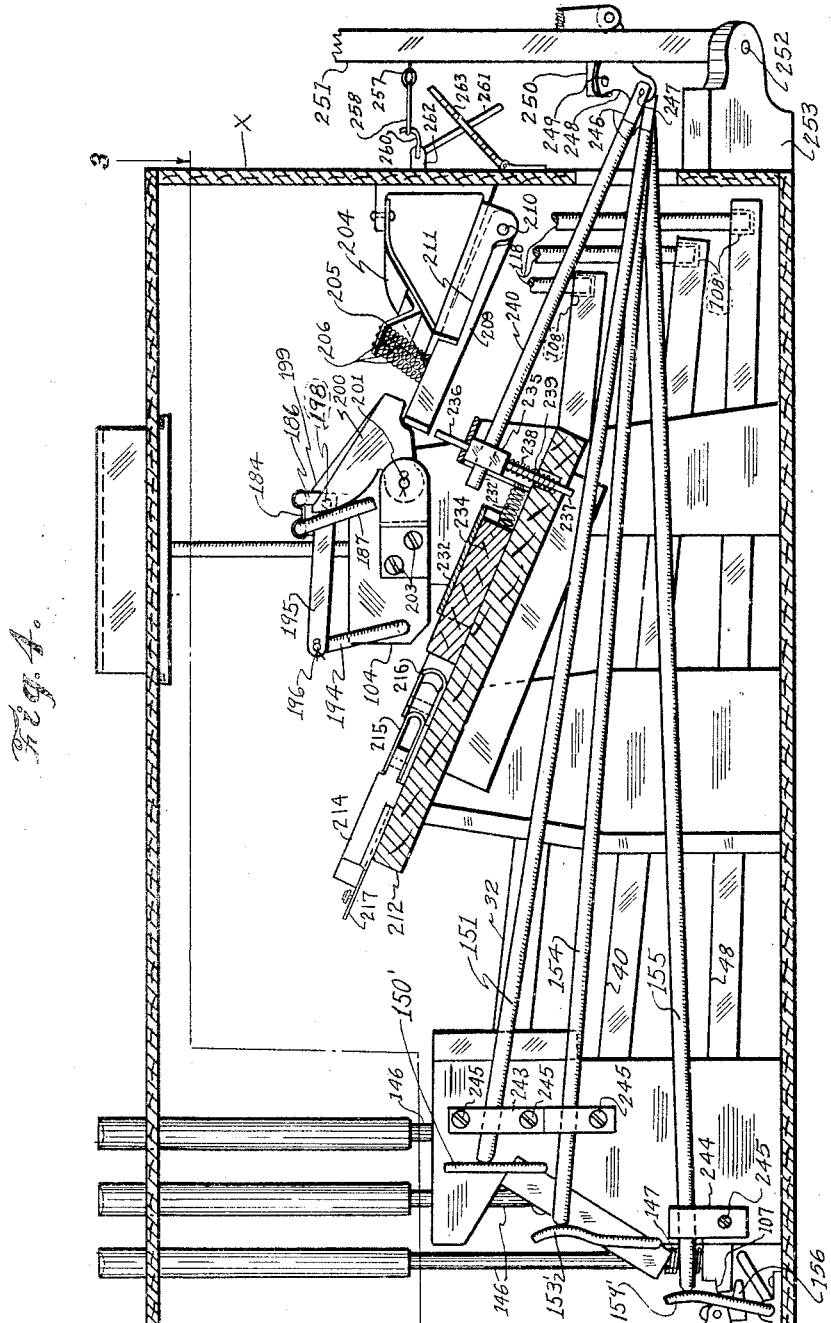

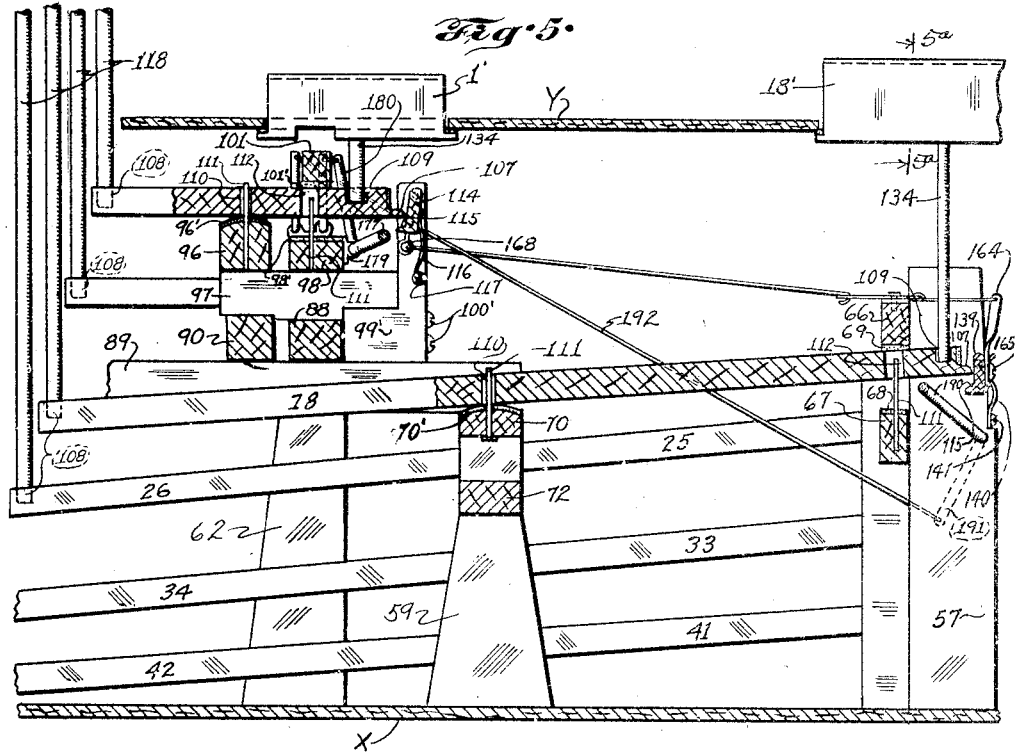

March 24, 1931. W. M. HALLBAUER 1,797,609
MECHANICAL GUITAR PLAYER
Filed May 16, 1929 8 Sheets-Sheet 6
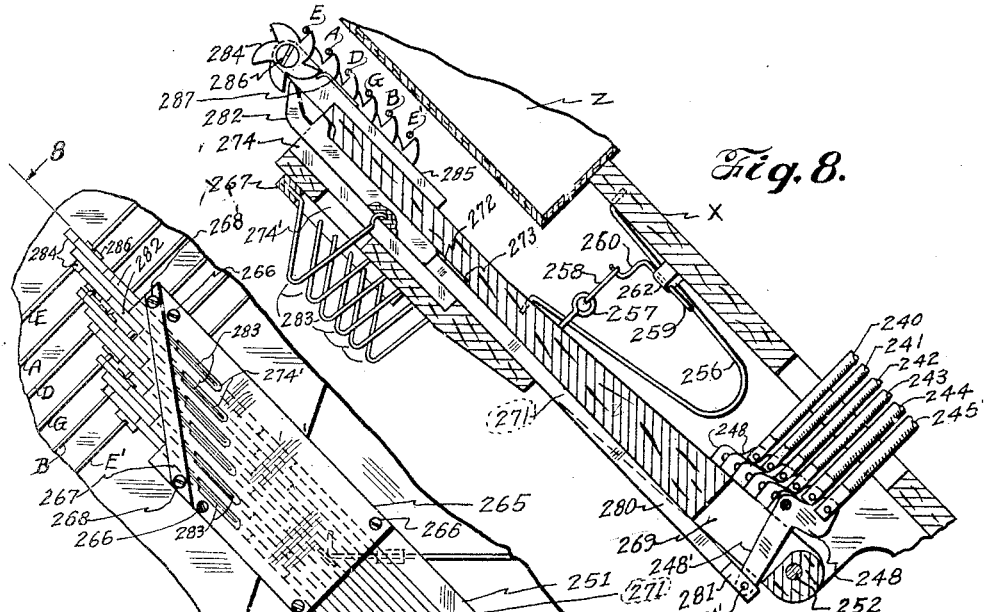
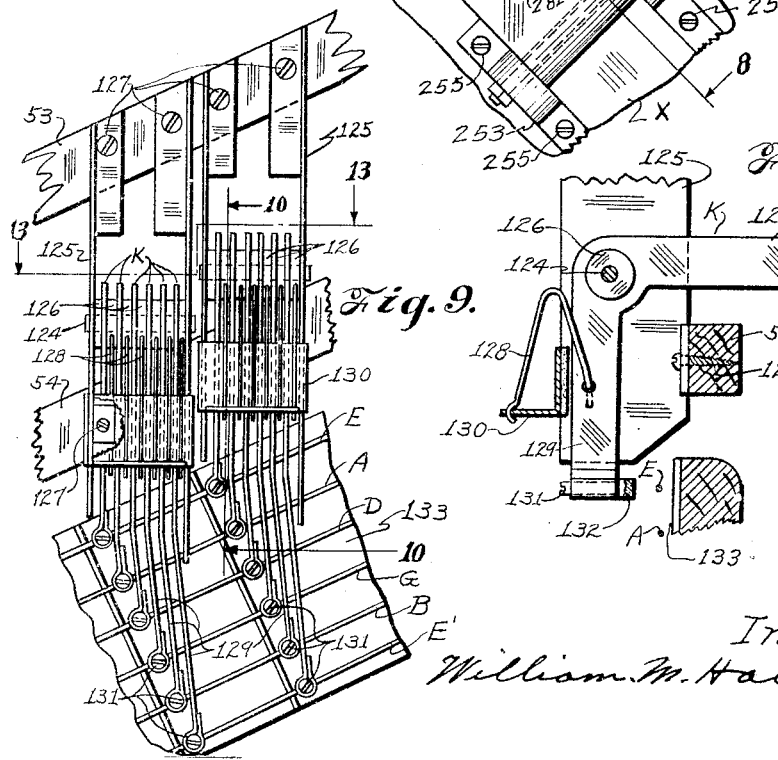
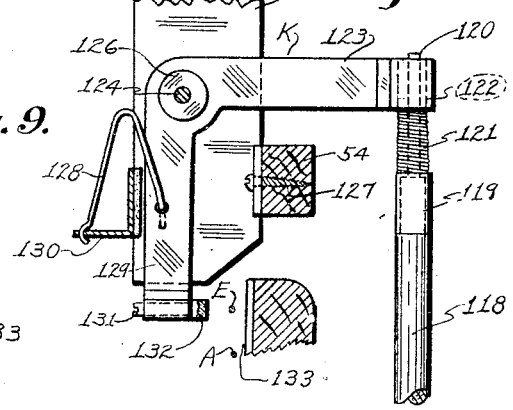
Inventor.
William M. Hallbauer March 24, 1931.  W. M. HALLBAUER  1,797,609
MECHANICAL GUITAR PLAYER
Filed May 16, 1929  8 Sheets-Sheet 7
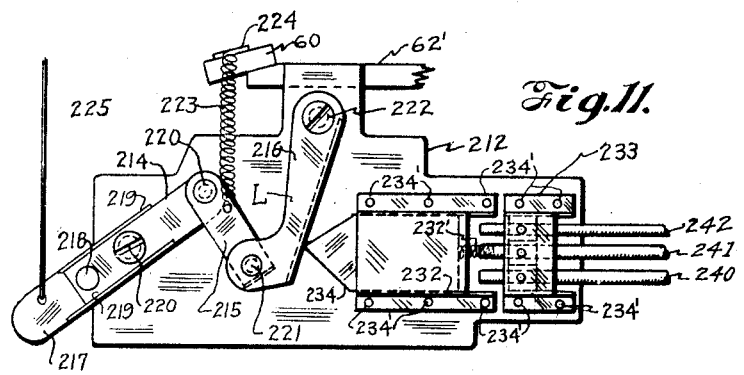
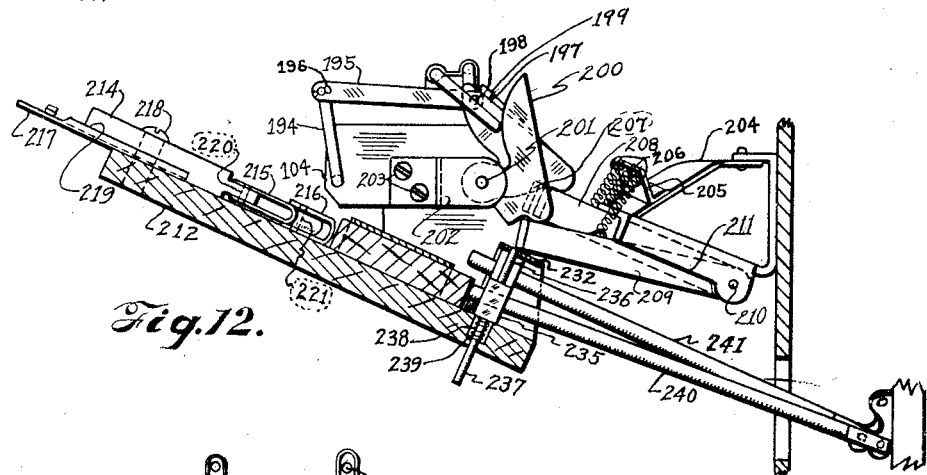
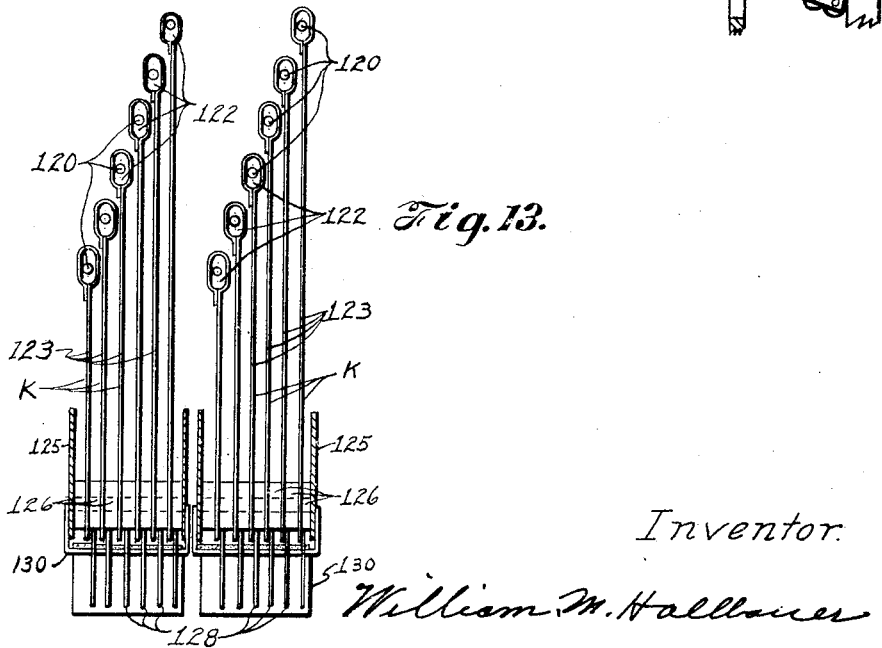
Inventor.
William M. Hallbauer Inventor
William M. Hallbauer Patented Mar. 24, 1931

1,797,609

UNITED STATES PATENT OFFICE

WILLIAM M. HALLBAUER, OF ST. LOUIS COUNTY, MISSOURI

MECHANICAL GUITAR PLAYER

Application filed May 16, 1929. Serial No. 363,593.

My invention relates to a mechanical guitar player adapted to be operated by a human being, and in its preferred form hereinafter described is so constructed all necessary operations may be made with the feet, to which are secured devices adapted for operating keys mounted in a key-board, and a knee and an arm of the operator; thus making it possible for the operator to play melody on some other instrument with his hands or mouth and accompaniment on the mechanical guitar player.

An object is to construct a mechanical guitar player that may be operated by the feet, an arm and a knee of a human being.

Another object is to make the construction so that independent means are provided for making any fret contact from the first to and including the seventh fret.

Another object is to make the construction so each fret contactor is controlled by a separate key located in a key board.

Another object is to make the construction so that the fret control keys are arranged in four sections on the key board and in parallel rows, and so each row of keys is adapted to control the respective fret contactors for a respective string on the guitar.

Another object is to make the construction so any fret contact made will be locked at the same time.

Another object is to make the construction so the same locking member locks all fret contacts made on a respective string of the guitar.

Another object is to provide independent means for releasing fret contacts made and locked on the respective strings of the guitar.

Another object is to provide in the construction means for releasing any locked fret contacts on guitar strings E', B and G at the same time.

Another object is to make the construction so that the keys that control the respective fret contactors for guitar strings D, A and E will also control respective mechanisms for plucking the guitar strings D, A and E.

Another object is to make the construction so that the position of the guitar when secured in place is the same as if held by a human player.

Another object is to make the construction so that guitar strings E', B and G may be plucked by the movement of a lever operated by the knee of the player.

With the foregoing, and other objects in view, the invention consists of the arrangement and combination of parts as hereinafter described and claimed.

I attain these objects by the mechanism illustrated in the accompanying drawings, in which—

Figure 2 is a rear elevation showing guitar in place.

Figure 2a is a diagram showing strings of the guitar and the first seven frets.

Figure 4 is a section taken on line 4—4 of Figure 3.

Figure 5 is a section taken along line 5—5, Fig. 3.

Figure 5a is a cross sectional view of a cupped key.

Figure 6 is a section taken along line 6—6, Fig. 3.

Figure 7 is a detail of the plucking mechanism.

Figure 8 is a section taken along line 8—8 in Fig. 7.

Figure 9 is an enlarged view of the first fret control.

Figure 10 is a section taken along line 10—10, Fig. 9.

Figure 11 is a detail plan view of a portion of the operating means for control of the fret contactors.

Figure 12 is a portion of the section taken along line 4—4 showing position of certain operative devices when ready to function.

Figure 13 is a plan view partly in section taken along line 13 in Fig. 9.

Figure 14:
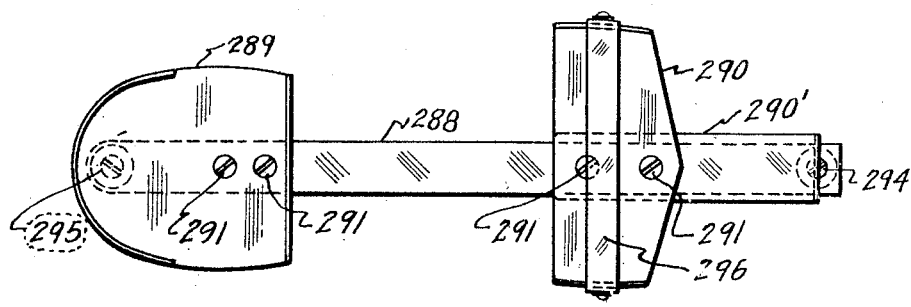
Figure 14 is a plan view of the left shoe 100 attachment for operating keys on the key board.
Figure 15:
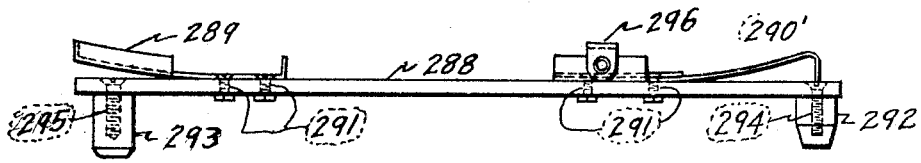

Figure 15 is a side elevation of Fig. 14.

Figure 16:
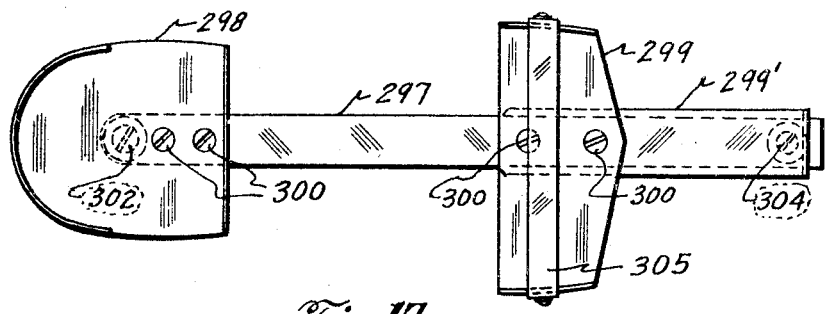

Figure 16 is a plan view of the right shoe attachment for operating keys on the key board.

Figure 17:
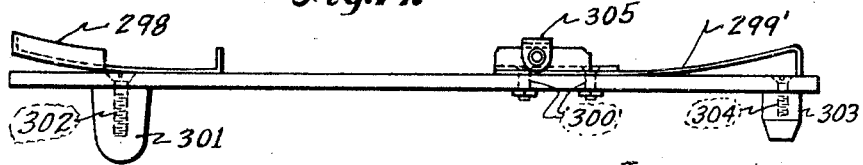

Figure 17 is a side elevation of Fig. 16.

Similar characters refer to similar parts throughout the several views.

A standard concert guitar is shown assembled with the device so the construction and operation of the device may be properly explained.

The details of construction and operation shown in the drawings are as herein set forth.

The rigidly constructed rectangular box X, provided with a key board top Y, in which are rectangular and cylindrical openings adapted to receive the respective control keys 1' to 48' inclusive, the vertical post 49, secured to the side of the box X to hold the bracket 50, that holds fast the sound body of the guitar Z, the vertical posts 51 and 52 secured to the side of the box X, the member 53 secured to the tops of posts 51 52, by screws 52' 52' 52' 52', and the member 54 secured to the posts 51 52 by screws 51' 51' constitutes the major frame work.

The details of the frame work within the box X for properly supporting operative mechanism are as follows:

Located within the box X are the vertical posts 56 57 58 59 60 61 62 63 64, each of which is secured firmly to the bottom of the box X by hold fast screws 65, some of which are shown. To posts 56 57 are secured, by hold fast means not shown, horizontal members 66 67, spaced a proper distance apart to permit the necessary upward and downward movement of operative members 17 to 24 inclusive. The top of the horizontal member 67 and the bottom of the horizontal member 66 are provided with felt strips 68 and 69, respectively, to prevent noise from contact of operative members 17 to 24 inclusive. The horizontal fulcrum member 70 is secured to the post 58 by screws 71 71 and to post 59 by means not shown, and extends to the right of post 59 a sufficient distance to provide support for operative members 22 23 24. Horizontal fulcrum members 72, 73, 74 (see Fig. 6) are secured to posts 59 and 60 by hold fast screws not shown, and are provided with felt strips 75 76 77, respectively, on their top surfaces. To posts 63 64 are secured horizontal members 78 79 80 81, by means not shown, and said horizontal members 78 79 80 are provided with felt strips 82 83 84, respectively, along their bottom surfaces, and horizontal members 79 80 81 are provided with felt strips 85 86 87, respectively, along their top surfaces. The purpose of the felt strips is to prevent noise due to contact of operative members between them. Horizontal member 88 is secured to posts 61 62, by means not shown, and is also supported near its center, by cross brace 89 secured to the fulcrum member 70 and the back side of the box X, by means not shown. The horizontal brace 91 is secured to posts 61 51, and the horizontal 92 to posts 52 62 by any practical means. Horizontal fulcrum member 90 is secured to brace 91 and brace 92 by screws 93 94, respectively, and the right portion of the horizontal fulcrum member 90 provides the fulcrum support for operative members 10 to 16 inclusive and releasing member 9, and is provided along its top surface with a felt strip 95. Horizontal fulcrum member 96 is supported on blocks 97 97 mounted on the top of horizontal member 90 and secured in place by screw 93 that holds fast in horizontal brace 91, and by a screw, not shown, in its other end that holds fast in the horizontal member 90, and horizontal fulcrum member 96 has a felt strip 96' secured along its top. Horizontal member 98 is secured to post 61 and bracket 99 by means not shown, and bracket 99 is secured to horizontal member 88 by screws 100 100, and also supported by spacing blocks 97 97, and is provided with a felt strip 98' along its top to prevent noise from contact of operative members 1 to 7 inclusive and releasing member 8 that are operative between horizontal members 98 and 101. Horizontal member 101 is carried by blocks, not shown, that are supported by horizontal member 98, and is secured in place by screws 102 102 that hold fast in horizontal member 88, and horizontal member 101 is provided with a felt strip 101' on its bottom to prevent noise due to contact of operative members 1 to 7 inclusive and releasing member 8 that are operative within the limits provided between horizontal member 101 and horizontal member 96. Horizontal member 103 is secured to bracket 99 by a screw not shown and to bracket 104 by means of a screw 105 that secures bracket 104 to horizontal member 88. Horizontal member 103 is provided with a felt strip 106 on its under side to prevent noise due to contact with operative members 10 to 16 inclusive and releasing member 9 that are operative between horizontal members 103 and 88.

The details of the construction for making any one of the first seven fret contacts on string E' of the guitar Z are as follows:

The operative members 1 to 7 inclusive are recessed at one end to provide flanges 107, and are also provided with vertical cylindrical recesses 108, and vertical cylindrical recesses 109, and vertical cylindrical openings 110, adapted to receive the studs 111 secured in the horizontal fulcrum member 96, and vertical slotted openings 112 adapted to receive studs 111 secured in the horizontal member 98, and said operative members are supported on the horizontal fulcrum member 96, and said operative members operate within the limits provided between horizontal members 101 and 98. Releasing member 8 is of the same construction as operative members 1 to 7 inclusive except it terminates at the fulcrum member 96 on which it is operatively mounted by the screw 113, and said releasing member is operative between the limits provided between the horizontal members 98 and 101.

The horizontal locking member 114 formed so as to provide a flange 115 is bearingly mounted in bracket 114' secured to post 61, by means not shown, and to bracket 99', secured to horizontal member 88 by screws 100' 100', and is adjacent the flanged ends of operative members 1 to 7 inclusive and the releasing member 8, and held in a resistive position relative to the flanges 107 by the compression spring 116 secured to the bracket 99' by the screw 117.

Vertical actuating rods are supported in the vertical cylindrical recesses 108 of the operative members 1 to 7 inclusive, and their upper ends are provided with ferrules 119 having studs 120 adapted to carry the compression springs 121 and to extend into the slotted openings 122 provided on the end of the arms 123 of the lever device K. Lever devices K are bearingly mounted on shafts 124 carried by brackets 125, and are spaced from each other of the shafts 124 by washers 126. The brackets 125 are secured to the members 53 and 54 by screws 127, some of which are shown. Tension springs 128 are operatively secured in arms 129 of the lever K and to the bracket 130, secured to brackets 125 125, by means not shown. The screw studs 131 are secured in the ends of lever arms 129 of the lever device K and are provided with rubber contactors 132 adapted to depress string E' of the guitar Z against the first, second, third, fourth, fifth, sixth and seventh frets, respectively, on the fretted finger board 133 of the guitar Z.

The rectangular cupped top keys 1' to 8' inclusive are provided with vertical rods 134 that rest, respectively, in the vertical cylindrical recesses 109 of the operative members 1 to 7 inclusive and releasing member 8, and said keys are operatively mounted within the rectangular openings provided for them in the key board top Y of the box X.

The details of the mechanism for making any one of the first seven fret contacts on string B of the guitar Z are as follows:

The operative members 10 to 16 inclusive are recessed at one end to provide flanges 107, and are also provided with vertical cylindrical recesses 108, and vertical cylindrical recesses 109, and vertical cylindrical openings 110 adapted to receive studs 111 secured in the horizontal fulcrum member 90, and vertical slotted openings 112, not shown, adapted to receive studs 111 secured in the horizontal member 88, and said operative members are supported by the horizontal fulcrum member 90, and said operative members operate within the limits provided between the horizontal members 88 and 103. Releasing member 9 is of the same construction as operative members 10 to 16 inclusive, except it terminates at fulcrum member 90 on which it is operatively mounted by a screw not shown, and said releasing member operates within the same limits as are provided for operative members last mentioned.

Horizontal locking member 135 formed so as to provide a flange 115 is bearingly mounted in brackets 104 and 99, and is adjacent the flanged ends of the operative members 10 to 16 inclusive and the releasing member 9, and is held in a resistive position relative to the flanges 107 by the compression spring 136 secured to the bracket 99 by the screw 137.

Vertical actuating rods 118 are supported in the cylindrical recesses 108 of the operative members 10 to 16 inclusive, and their upper ends are provided with ferrules 119 having studs 120 adapted to carry the compression springs 121 and to extend into the slotted openings 122 provided on the ends of the arms 123 of the lever devices K. Lever devices K are bearingly mounted on shaft 124 carried by brackets 125 125 and are spaced from each other on the shaft 124 by washers 126. The brackets 125 are secured to the members 53 and 54 by screws 127, some of which are shown. Tension springs 128 are operatively secured in the arms 129 of the lever devices K and to the brackets 130 secured to the brackets 125 by means not shown. The screw studs 131 are secured in the end of lever arms 129 of the lever device K, and are provided with rubber contactors 132 adapted to depress string B of the guitar Z against the first, second, third, fourth, fifth, sixth and seventh frets, respectively, on the fretted finger board 133 of the guitar Z.

The rectangular cupped top keys 9' to 16' inclusive are provided with vertical rods 134 that rest respectively in the vertical cylindrical recesses 109 of the operative members 10 to 16 inclusive and releasing member 9, and said keys are operatively mounted in rectangular openings provided for them in the top Y of the box X.

The details of the mechanism for making any one of the first seven fret contacts on string G of the guitar Z, are as follows:

The operative members 18 to 24 inclusive are recessed at one end to provide flanges 107, and are also provided with vertical cylindrical recesses 108, and vertical cylindrical recesses 109, and vertical cylindrical openings 110, adapted to receive the studs 111 secured in the horizontal fulcrum member 70, and vertical slotted openings 112 adapted to receive studs 111 secured in the horizontal member 67, and said operative members are supported by the horizontal fulcrum member 70, and are operative between the horizontal members 66 and 67. Releasing member 17 is of the same construction as operative members 18 to 24 inclusive except it terminates at fulcrum member 70, on which it is operatively mounted by screw 138, and the releasing member operates within the limits provided between horizontal members 66 and 67.

Horizontal locking member 139 formed so as to provide a flange 115 is bearingly mounted in post 56 57 and adjacent the flanged ends 107 of the operative members 18 to 24 inclusive and the releasing member 17, and held in a resistive position relative to the flanges 107 by the compression spring 140 secured to the post 65 by the screw 141.

Vertical actuating rods 118 are supported in the vertical cylindrical recesses 108 of the operative members 18 to 24 inclusive, and their upper ends are provided with ferrules 119 having studs 120 adapted to carry the compression springs 121 and to extend into the slotted openings 122 provided on the end of the arms 123 of the lever devices K. Lever devices K are bearingly mounted on shaft 124 carried by brackets 125 125, and are spaced from each other on the shaft 124 by the washers 126. The brackets 125 are secured to the members 53 54 by screws 127, some of which are shown. Tension springs 128 are operatively secured in arms 129 of the lever devices K and to the brackets 130 secured to the brackets 125, by means not shown. Screw studs 131 are secured in the end of lever arms 129 of the lever device K and are provided with rubber contactors 132 adapted to depress string G of the guitar Z against the first, second, third, fourth, fifth, sixth and seventh frets, respectively, on the fretted finger board 133 of the guitar Z.

The rectangular cupped top key 17' to 24' inclusive are provided with vertical rods 134 that rest, respectively, in the vertical cylindrical recesses 109 of the operative members 18 to 24 inclusive, and releasing member 17, and said keys are operatively mounted within rectangular openings provided for them in the key board top Y of the box X.

The details of the mechanism for making any one of the first seven fret contacts on string D of the guitar Z, are as follows:

The operative members 26 to 32 inclusive are recessed at one end to provide flanges 107, and are also provided with vertical cylindrical recesses 108, and vertical cylindrical openings 143, and vertical cylindrical openings 110, adapted to receive studs 111 secured in the horizontal fulcrum member 72, and vertical slotted openings 112 adapted to receive studs 111 secured in the horizontal member 79, and said operative members are supported by the horizontal fulcrum member 72 and operate within the limits provided between horizontal members 78 and 79. Releasing member 25 is of the same construction as the operative members except it terminates at the fulcrum member 72 on which it is operatively mounted by screw not shown, and it is also operative between horizontal members 78 and 79.

The horizontal locking member 145 formed so as to provide flange 115 is bearingly mounted in posts 63 64, by any practical means, and adjacent the flanged ends 107 of the operative members 26 to 32 inclusive and the releasing member 25, and held in a resistive position relative to the flanges 107 by the compression spring not shown that is secured to the post 64 by means not shown.

Vertical actuating rods 118 are supported in the recesses 108 of the operative members 26 to 32 inclusive, and their upper ends are provided with ferrules 119 having studs 120 adapted to carry the compression springs 121 and to extend into the slotted openings 122 provided on the end of the arms 123 of the lever devices K. Lever devices K are bearingly mounted on shaft 124 carried by the brackets 125 125, and are spaced from each other on the shaft 124 carried by the brackets 125 125 by the washers 126. The brackets 125 are secured to the members 53 54 by screws 127, some of which are shown. Tension springs 128 are operatively secured in arms 129 of the lever devices K and to the bracket 130 secured to brackets 125, by means not shown. Screw studs 131 are secured in the ends of lever arms 129 of lever devices K and are provided with rubber contactors 132 adapted to depress string D of the guitar Z against the first, second, third, fourth, fifth, sixth and seventh frets, respectively, on the fretted finger board 133 of the guitar Z.

The cylindrical cupped top keys 25' to 32' inclusive are provided with vertical rods 146 the ends of which extends into the vertical openings 143 provided in the ends of the operative members 26 to 32 inclusive and releasing member 25, and there is secured to and around the said vertical rods, near their ends, compression springs 147, and these springs are adapted to rest on the said operative members and furnish a resistive force against any force applied to the keys for pushing the ends of the rods 146 through the holes 143. This spring arrangement makes it possible, by varying the pressure on the keys, to perform two operations necessary to mechanically play the string D on the guitar Z, viz: The locking of a fret contactor on the string D and the plucking of the string D. A light pressure on one of the keys will push the operative member, with which it is associated, down and against the horizontal member 79 and the flange 107 under the locking member 145 making a fret contact through the mechanism heretofore described. If sufficient force is applied to the same key the compression spring 147 compresses sufficient to permit the end of the rod 146 to come in contact with and actuate operative member 148 bearingly mounted in posts 63 64 and formed so as to provide the lever arm 150′ adapted to push forward member 151 that actuates the mechanism provided to pluck string D on the guitar Z. A light pressure on the key 41′ will release any locked fret contact on string D. A greater pressure will cause the string D to be plucked, but when it is plucked there is no fret contact on string D.

The details of the mechanism for making any one of the first seven fret contacts on the string A of the guitar Z, are as follows:

The operative members 34 to 40 inclusive are recessed at one end to provide flanges 107, and are also provided with vertical cylindrical recesses 108, and vertical cylindrical openings 143, and vertical cylindrical openings 110, adapted to receive studs 111 secured in the horizontal fulcrum member 73, and vertical slotted openings 112 adapted to receive studs 111 secured in horizontal member 80, and said operative members are supported by the horizontal fulcrum member 73 and are operative between the limits provided between the horizontal members 79 and 80.

Releasing member 33 is of the same construction as the operative members except it terminates on the fulcrum member 73 where it is operatively mounted on a screw not shown, and said releasing member is operative between the limits between members 79 and 80.

The horizontal locking member 152 formed so as to provide a flange 115 is bearingly mounted in posts 63 64 and adjacent the flanged ends 107 provided on the ends of the operative members 34 to 40 inclusive and the releasing member 33, and is held in a resistive position relative to the flanges 107 by the compression spring, not shown, secured to the post 64 by means not shown.

Vertical actuating rods 118 are supported in the vertical cylindrical recesses 108 of the operative members 34 to 40 inclusive, and their upper ends are provided with ferrules 119 having studs 120 adapted to carry the compression springs 121 and to extend into the slotted openings 122 provided on the end of the arms 123 of the lever device K. Lever devices K are bearingly mounted on shaft 124 carried by the brackets 125 125, and are spaced from each other on the shaft by the washers 126. The brackets 125 are secured to the members 53 54 by screws 157, some of which are shown. Tension springs 128 are operatively secured in arms 129 of the lever devices K and to the bracket 130 secured to the brackets 125 by means not shown. The screw studs 131 secured in the end of the lever arms 129 of the lever devices K are provided with rubber contactors 132 adapted to depress string A of the guitar Z against the first, second, third, fourth, fifth, sixth and seventh frets, respectively, on the fretted finger board 133 of the guitar Z. The cylindrical cupped top keys 33′ to 40′ inclusive are provided with vertical rods 146 the ends of which extend into the vertical openings 143 provided in the ends of the operative members 34 to 40 inclusive and releasing member 33, and there is secured to and around the said vertical rods, near their ends, compression springs 147, and these springs are adapted to rest on the respective operative members 34 to 40 inclusive and releasing member 33, and furnish a resistive force against any force applied to the keys for the purpose of pushing the ends of the vertical rods 146 through the openings 143. The spring arrangement makes it possible, by varying the pressure on the keys, to perform the two operations necessary to mechanically play string A on the guitar Z, viz: The locking of a fret contactor on the string A and the plucking of the string A. A light pressure on one of the keys will push the operative member, with which it is associated, down and against the horizontal member 80 and the flange 107 under the locking member 152, and such downward movement of the operative member actuates the mechanism heretofore described and makes the fret contact on the string A. If sufficient force is applied to the key compression spring 147 compresses sufficient to permit the end of the rod 146 to come in contact with and actuate operative member 153 bearingly mounted in posts 63 64, and formed so as to provide the lever arm 153′ adapted to push forward member 154 that actuates the mechanism provided to pluck string A on the guitar Z. A light pressure on key 33′ will release any fret contact on string A. A greater pressure will actuate operative member 153 and cause the string A to be plucked, but when it is plucked there is no fret contact on string A.

Details of the construction for making any one of the first seven fret contacts on string E of the guitar Z are as follows:

The operative members 42 to 48 inclusive are recessed at one end to provide flanges 107, and are also provided with vertical cylindrical recesses 108, and vertical cylindrical openings 143, and vertical cylindrical openings 110 adapted to receive studs 111 secured to horizontal fulcrum member 74, and vertical slotted openings 112 adapted to receive studs 111 secured in horizontal member 81, and said operative members are supported by horizontal fulcrum member 74 and are operative between the limits provided between horizontal members 80 and 81. Releasing member 41 is of the same construction as the operative members except it terminates on the fulcrum member 74 where it is operatively mounted on screw not shown.

Horizontal locking member 156 formed so as to provide a flange 115 is bearingly mounted in brackets 157 158 secured to the side of box X by any practical means, and is mounted adjacent the flanged ends of the operative members 42 and 48 inclusive and the releasing member 41, and held in a resistive position relative to the flanges 107 by the tension spring 156' secured to the bottom of box X and locking member 156 by means not shown.

Vertical actuating rods 118 are supported in the vertical cylindrical recesses 108 of the operative members 42 to 48 inclusive and their upper ends are provided with ferrules 119 having studs 120 adapted to carry the compression springs 121 and to extend into the slotted openings 122 provided on the ends of the arms 123 of the lever devices K. Lever devices K are bearingly mounted on shaft 124 carried by the brackets 125 125 and are spaced from each other on the shaft by washers 126. The brackets 125 are secured to the members 53 54 by screws 127, some of which are shown. Tension springs 128 are operatively secured in arms 129 of the lever devices K and to the bracket 130 secured to the brackets 125 by means not shown. The screw studs 131 secured in the ends of lever arms 129 are provided with rubber contactors 132 adapted to depress string E on the guitar Z against the first, second, third, fourth, fifth, sixth and seventh frets, respectively, on the fretted finger board 133 of the guitar Z.

The cylindrical cupped top keys 41' to 48' inclusive are provided with vertical rods 146 the ends of which extends into the vertical openings 143 provided in the ends of the operative members 42 to 48 inclusive and releasing member 41, and there is secured to and around the said vertical rods, near their ends, compression springs 147, and these springs are adapted to rest on the respective operative members 42 to 48 inclusive and releasing members 41 and furnish a resistance force against any force applied to the keys for the purpose of pushing the ends of the vertical rods 146 through the openings 143. The spring arrangement makes it possible, by varying the pressure on the keys to perform the two operations necessary to play string E on the guitar Z, viz: the locking of a fret contactor on the string E and the plucking of the string E. A light pressure on one of the keys will push the operative member, with which it is associated, down and against the horizontal member 81 and the flange under the locking member 156, and such downward movement of the operative member actuates the mechanism heretofore described and makes the fret contact on the string E. If sufficient force is applied to the key compression spring 147 compresses sufficiently to permit the end of the rod 146 to come in contact with and actuate operative member 159, bearingly mounted in bearings 63' 64' secured to the bottom of the box X by any hold fast means, and formed so as to provide the lever arm 159' adapted to push forward member 155 that actuates the mechanism provided to pluck the string E on the guitar Z. A light pressure on key 41' will release any fret contact on string E. A greater pressure will actuate lever arm 159' and cause string E to be plucked, but when plucked there is no fret contact on string E.

Details of the mechanism and its operation to release any locked fret contactor on guitar strings E', B and G at the same time, are as follows:

If any fret contact is made on any one, or any two or each of the guitar strings E', B and G the flanges 107 on the operative members associated with the mechanism operating these contactors will be locked under the locking member with which it is associated, and if any flange locked under is released the operative member of which it is a part will return to its normal position due to the action of the spring 121, and the fret contactor 132 will be drawn back from the guitar string by the action of tension spring 128, so the mechanism to be described relates to that required to release the flanges 107 that are held under locking members 114, 135, 139, as the other part of the operation is automatic, as stated. Lever plates 161 and 162 are operatively mounted on horizontal member 66 and lever plate 163 on horizontal member 78 by screws shown but not designated by number. Lever plate 162 and bracket 164 secured to the locking member 139, by screw 165, are operatively connected by wire 166. Wire 167 is operatively connected to lever plate 161 and eye screw 168 secured in locking member 114, and wire 169 is operatively connected to lever plate 163 and eye screw 170 secured in locking member 135. Wire 171 is operatively connected to lever plates 161 162 163 and secured fast in lever 172 operatively mounted at one end in a bearing bracket secured to the side of and near the bottom of the box X, and lever 172 is also operatively supported by bracket 173 secured to the side of the box X by screws shown but not designated by numbers, and said bracket is provided with felt strips 174 175, and lever 172 is adapted to operate within the limits provided between said felt strips. Bracket 176 is secured to the end of lever 172 and furnishes a convenient contact for the arm of an operator when he wishes to push the lever out and release all operative members or releasing members held under locking members 139 141 135. If the lever arm 172 is pushed to its outward limit the mechanism described will turn the said locking members back and free from under them any flange 107 of an operative member or releasing member held thereunder, and when released said operative members and contactors will return to their normal positions.

Details of the mechanism for plucking guitar strings E', B and G and its operation are as follows:

Operative member 177 is mounted in bearings 178 179 secured to the horizontal member 98, by screws not shown, and is provided with a lever arm 180. Operative members 181 and 182 are bearingly mounted in bearings 183 184 secured to the horizontal member 103, by screws shown but not designated by number. Operative member 181 is provided with lever arms 185 186 at its respective ends. Operative member 182 is formed to provide lever arms 187 188 at its respective ends. Lever arms 180 and 188 are operatively connected by a wire link 189 mounted through openings provided in the said lever rods. Operative member 190 is bearingly mounted in posts 56 57 and provided with a lever arm 191 provided with an opening near its end in which is operatively secured wire 192 that is also operatively secured to lever arm 185 through a hole provided near the end of said lever arm. Operative member 193 is bearingly mounted in brackets 104 and 99, and is provided at one end with a lever arm 194 the end of which is bent at right angles to said arm to form a bearing member for member 195 that is mounted thereon and properly retained by cotter pin 196. Member 195 is operatively connected with actuating member 197 by bearing rivet 198 that extends through member 195 and is secured in member 197. Actuating members 197 199 200 are bearingly mounted on shaft 201 carried by bracket 202 that is secured to bracket 104 by hold fast screws 203 203. To the side of box X is secured, by hold fast means not shown, bracket 204, and bracket 204 is provided with a bracket 205 to which are secured tension springs 206 206 206, and said tension springs are also, respectively, secured to actuating members 207 208 209 operatively mounted on bearing rivet 210 held by the legs of channel 211 provided on the bottom of bracket 204 to furnish proper alignment means for actuating members 207 208 209, and said actuating members are adapted to be actuated by actuating members 199 197 200, respectively. Springs 206 sustain operative members 207 208 209 against actuating members 199 197 200, respectively, and said actuating members against arms 186 and 194 through the members 195, and 187, respectively at all times, and return said arms to their normal position when operative force is not applied to said arms.

The supporting member 212 is secured to the side of the box X, by screws not shown, and to the horizontal brace 62', that is secured to posts 62 60, by screw 213.

The lever device L comprises lever arms 214 215 216 and the member 217 secured to the member 214 by rivet 218 and flanges 219 219. Arms 214 215 216 are operatively connected by bearing rivets 220 221, and the lever device L is bearingly mounted on bearing screws 220 222 secured in the supporting member 212. The member 217 and a bearing washer, not shown, surrounding screw 222 and between the supporting plate 212 and the lever arm 216 prevents contact of said lever arms against supporting plate 212. Tension spring 223 is operatively connected with lever arm 215 and any suitable bracket 224 secured to post 60, by means not shown. Wire 225 is operatively connected to member 217 and lever 226 bearingly mounted on shaft 227 of bracket 228 secured to the side of the box X by any hold fast means, and bracket 229 is provided with felt strips 230 231 to prevent noise that would otherwise occur if lever 226 came in contact with bracket or side of box X. To the top of lever 226 is secured by any practical means bracket 232 adapted to provide a contact means for the knee of the player of the device when he desires to push lever 226 outward and pluck guitar strings on which a fret contact has been made by the mechanism hereinafter described. When lever 226 is pushed outward, by the knee, and released spring 223 associated with lever device L returns lever 226 to its normal position. Brackets 232 and 233 are secured to supporting member 212 by screws 234', and operatively mounted within bracket 232 and adjacent supporting member 212 is operative plunger 234 adapted to be actuated by arm 216 of lever device L, and plunger 234 retains contact with arm 216 at all times due to the action of compression spring 232' secured to the supporting member 212 and plunger 234, by means not shown.

Located within bracket 233 are rectangular operative members 235 235 235 each provided with studs 236 and 237 operatively mounted in cylindrical openings provided in bracket 233 and supporting member 212, and studs 237 237 237 are surrounded with compression springs 238 238 238 located within recesses 239 239 239 and between the rectangular operative members and the shoulders provided by the recesses 239, and said rectangular operative members are provided with cylindrical openings, not shown, adapted to receive actuating members 240 241 242, respectively. Studs 236 will be depressed by operative members 207 208 209 when said operative members are depressed by actuating members 199 197 200, and when depressed will be in a position like that shown in Fig. 12, where actuating member 200 depressed operative member 209, and when not depressed will be as shown in Fig. 4. The position of actuating member 240 illustrated in Fig. 4 is the normal position of actuating members 240 241 242. The position of actuating member 240 in Fig. 12 is the position of any of said actuating members when pushed forward by the plunger 234 to actuate mechanisms for plucking guitar strings. To one end of the said actuating members and to one end of actuating members 151 154 155, operatively mounted in brackets 243 and 244, respectively, and secured to post 64 by screws 245, are secured ferrules 246 246 246 246 246 246, each of which is provided with a slotted shank within which is bearingly mounted, on the rivet 247 secured to the shanks, an arm of levers 248 248 248 248 248 248, respectively. Levers 248 are bearingly mounted on rivets 249 249 249 249 249 249 secured to the brackets 250 250 250 250 250 250 that are secured to member 251, by screws not shown. Member 251 is bearingly mounted on bolt 252 carried by brackets 253 254 secured to the outside of the box X by hold fast screws 255 255 255 255 and is adjustably held from said box by compression spring 256, the ends of which are inserted in proper recesses provided in member 251 and side of box X, and adjustable holding mechanism comprising the eye screw 257 secured to the member 251, the link 258 connecting eye screw with bearing lug on end of arm 260 of the lever rod 259 provided with lever arms 260 261 and mounted in bearings 262 262 secured to the outside of box X by means not shown, and the hinge 263 one leaf of which is secured to the outside of the box X by screws 264 264 and the other provided with a plurality of holes adapted to receive the end of arm 261 of lever rod 259. The member 265 is secured to member 251 by screws 266 266 266 266 and member 267 is secured to member 265 by screws 268 268. Member 251 is provided with slotted openings 269 269 269 269 269 269 within the limits of which the lever arms 248' of the respective levers 248 operate, and is also provided with parallel grooves 271 271 271 271 271 271 and parallel grooves 272 272 272 272 272 272. The parallel grooves last mentioned are in alignment with the grooves first mentioned and are of uniform depth and length and extend from the end of member 251 to the beginning of the grooves 271, and said grooves are slightly deeper at their outer ends and formed to provide shoulders 273 273 273 273 273 273. Grooves 271 start at the ends of grooves 272 and slightly above their bottom, to provide shoulders 273 273 273 273 273 273, and slope upward until they reach their ends at the respective slotted openings 269. The member 265 is also provided with parallel grooves 274 274 274 274 274 274 that start at the outer end of the member 265 and end directly above the ends of grooves 272, and said grooves are directly over grooves 272. Member 265 is also provided with slotted openings 274' 274' 274' 274' 274' 274' adapted to receive springs 283 283 283 283 283 283. All the grooves are rectangular in cross section and are adapted to receive the members that operate within them. Actuating members 275 276 277 278 279 280 are provided with metal ferrules 281 having slotted ends and within the slotted ends are bearingly mounted the respective lever arms 248' of the levers 248 on the bearing rivets 281', and said actuating members are operatively mounted within the grooves 271. Within the grooves 272 are operatively mounted actuating members 282 282 282 282 282 282 and said actuating members are resistantly held downward and against forward movement by the springs 283 283 283 283 283 283, the respective ends of which are mounted in recesses provided in said members and in member 267. This spring action keeps contact of the said actuating members 282 with the actuating members that actuate them and also permits the actuating members 282 to rise up in the grooves 274, directly above, when the said actuating members are pushed forward and ride the teeth of the plucking wheels 284 284 284 284 284 284 and also provides the means to immediately return said actuating members to their normal position when they are released by the actuating members that force them forward, which will happen when lever arms 248' of levers 248 return to their normal position. Members 285 285 285 285 285 285 are secured to member 251, by means not shown, and each is provided with a bearing rivet 286 on which is bearingly mounted a plucking wheel 284 and a compression spring 287, by means not shown, having an operative end similar to that shown in Fig. 8, and said springs are adapted to ride the ends of the teeth of the plucking wheels 284 as the wheels are turned forward, and their purpose is to prevent plucking wheels 284 from turning backward sufficiently to permit the teeth on the plucking wheels to strike a string on the guitar Z at any time and especially when the members 282 return to their normal position at which time there is a slight tendency to turn the plucking wheels backward due to their slight dragging action on a tooth of the said wheels. The teeth depress the springs slightly when the plucking wheels are turned forward and resist the backward turning of the wheels when the teeth strike the end of the springs 287 on backward movement, for at this time the springs are in their normal position which is within the radius travel of the teeth of the plucking wheels. The plucking wheels 284 are provided with five smoothly finished plucking teeth, respectively, and formed as illustrated in Fig. 8, and held in proper position relative to the guitar strings E A D G B E' by the mechanism heretofore described for properly positioning member 251, and said plucking wheels are adapted to pluck the said guitar strings when actuated by members 282, which are formed in the manner illustrated in Fig. 8. When any actuating member 282 is pushed forward the plucking wheel is turned forward by the end of actuating member 282 against a tooth and its curved portion rides the following tooth, and when member 282 is at its extreme forward position the ridden tooth rests against the shoulder provided on member 282 at the end of the curved portion that rides the tooth, and the plucking tooth plucks the guitar string slightly before actuating member 282 reaches its extreme forward position and when the actuating member 282 reaches its forward limit its pressure on the plucking wheel prevents further forward movement of the plucking wheel. The plucking action on the string is similar to that made by the fingers of a human player and the vibrations are as desired to produce the required sound.

Figure 1:
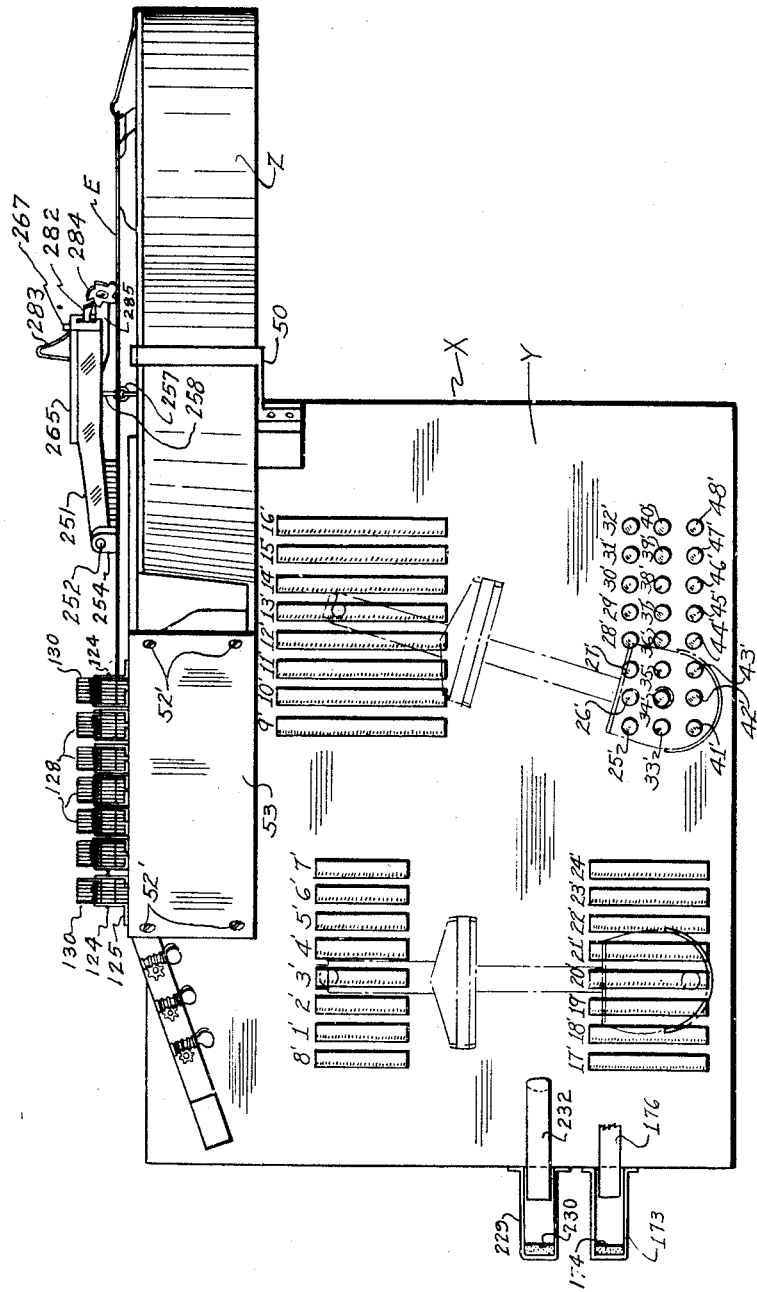
Figure 1 is a top plan view of the entire mechanical guitar player with any standard concert guitar attached, and the right and left shoe attachments for operating the keys shown on the key board.
Figure 3:
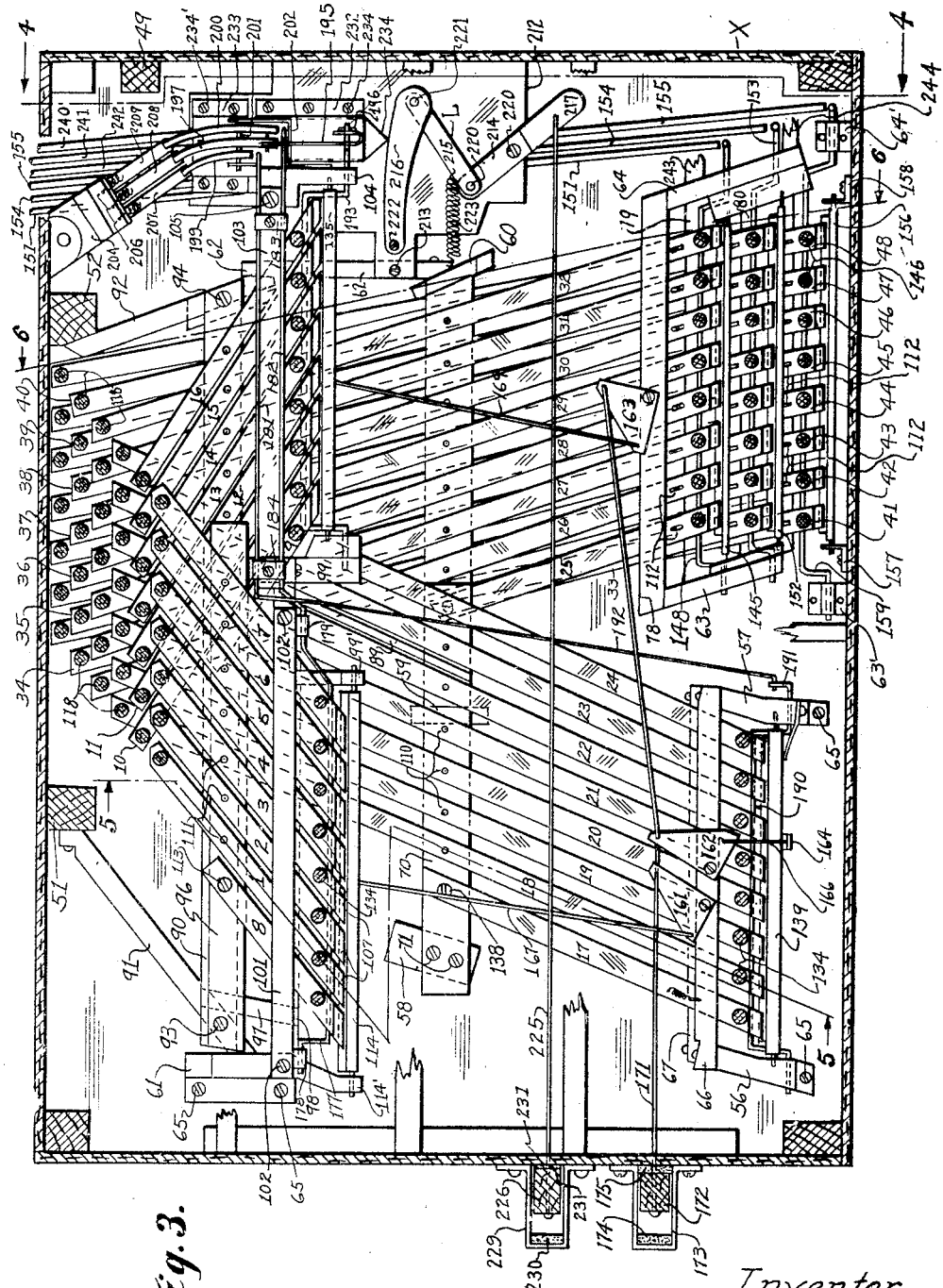
Figure 3 is a plan view taken along line 3—3, Fig. 4.

The key board construction and its control are as follows:

The key board is arranged as illustrated in Fig. 1. Keys 1' to 7' inclusive control the first seven fret contacts, respectively, on string E' and key 8' controls the releasing of any fret contact made by keys 1' to 7' inclusive. Keys 10' to 16' inclusive control the first seven fret contacts, respectively, on string B, and key 9' controls the releasing of any fret contact made by the keys 10' to 16' inclusive. Keys 18' to 24' inclusive control the first seven fret contacts, respectively, on string G and key 17' controls the releasing of any fret contact made on keys 18' to 24' inclusive. Keys 26' to 32' inclusive control the first seven fret contacts, respectively, on string D, and key 25' controls the releasing of any fret contact made on keys 26' to 32' inclusive, and keys 26' to 32' inclusive also control, respectively, the plucking mechanism for plucking the guitar string D and key 26' also controls the plucking mechanism on string D and is used when desiring to pluck string D without a fret contact made thereon. Keys 34' to 40' inclusive control the first seven fret contacts, respectively, on string A and key 33' controls the releasing of any fret contact made by keys 34' to 40' inclusive, and keys 34' to 40' inclusive also control, respectively, the plucking mechanism for plucking the guitar string A, and key 33' also controls the plucking mechanism on string A and is used when wishing to pluck string A without any contact made thereon. Keys 42' to 48' inclusive control the first seven fret contacts, respectively, on string E, and key 41' controls the releasing of any fret contact made on string E, and keys 42' to 48' inclusive also control, respectively, the plucking mechanism for plucking string E, and key 41' also controls the plucking mechanism on string E and is used when desiring to pluck string E without any fret contact made thereon.

From the description of the construction of the mechanical guitar player heretofore given it is evident that only one fret contact can be made on any string of the guitar at the same time; that any fret contact is automatically locked when made; that any fret contact made on a string is automatically released when any other fret contact is made on the same string; that any fret contact on a string can be released by depressing the key controlling the releasing member for that string; that there is a control key on the key board for each fret contactor; that the keys that control the fret contactor on the guitar strings D, A and E also independently control the mechanisms provided to pluck the string with which they are associated; that the keys that control the fret contacts on guitar strings E', B and G also control the mechanism adapted to put in operative position the means provided to pluck the guitar string E', B and G; that a lever, with a bracket, adapted to be pushed by the arm of a human player is provided and controls the mechanism for releasing any fret contact made on the strings E', B and G at the same time; that another lever, with a bracket, adapted to be pushed by the knee of a human player is provided and furnishes the power, when pushed outward, to operate the mechanism provided to pluck strings E', B and G.

It is therefore evident that by proper operation of the keys on the key board and the two levers mentioned the guitar may be played, and as I wish to have a mechanical guitar player adapted to be operated by the feet, a knee and an arm of a human being so he may at the same time play melody on some other instrument with his hands or mouth I have provided two devices adapted to be secured, respectively, to the shoes of the player. Each of these devices is provided with two contactors adapted to rest in the respective cupped top keys when placed there by the feet of the player for the purpose of depressing keys. Figures 14 and 15 illustrate the device for the left shoe and Figures 16 and 17 the device for the right shoe. To member 288 (see Figures 14 and 15) is secured the heel clamp 289 and the sole clamp 290 and the sole support 290' by the bolts 291 291 291 291, and the rubber contactors 292 and 293 by the screws 294 295 respectively. The heel clamp is formed as shown and of a size adapted to fit the heel of the shoe of the player and the sole clamp to fit the sole of the shoe, and the sole clamp is provided with an elastic band 296 under which the shoe rests when the device is secured to the shoe. Member 291' furnishes a support for the curved portion of the sole of the shoe. Contactor 292 is adapted to depress keys 1' to 8' inclusive and contactor 293 is adapted to depress keys 17' to 24' inclusive.

To the member 297 (see Figures 16 and 17) is secured the heel clamp 298, the sole clamp 299 and the sole support 299' by the bolts 300 300 300 300, and the rubber contactor 301 by the screw 302 and the fiber contactor 303 by the screw 304. The sole clamp 299' is provided with an elastic band 305 that fits over the shoe when the device is in place and the member 299' furnishes a support for the curved portion of the sole of the shoe. The heel clamp is formed as shown and adapted to fit the heel of the shoe of the operator, and the sole clamp is formed to fit the sole of the shoe. The contactor 301 is adapted to depress keys 25' to 48' inclusive and contactor 303 is adapted to depress keys 9' to 16' inclusive.

I wish to point out that my string plucking device pushes the strings in when plucking which will give a true and clear tone as the sound waves are carried directly into the sound body of the guitar. As far as I know the plucking devices on the market pull the string sideways when plucking which causes the sound wave vibrations to be parallel to the sound body of the guitar and the strings to give a whang sound.

Various changes may be made without departing from the spirit of the invention as claimed, and my mechanical player for guitars is also adapted for similar instruments.

I claim:

1. The combination in a mechanical guitar player of a key board, keys mounted in the key board so as to be depressed by devices secured to the shoes of a human being, means controlled by the keys for making fret contacts on the strings of a guitar and automatic means for locking the fret contacts when made, means controlled by the keys that automatically releases a locked fret contact on a string of the guitar before another locked fret contact is made thereon, special keys for releasing any locked fret contact on the respective strings of the guitar, and special means for releasing locked fret contacts from the treble strings of the guitar at the same time.

2. In a mechanical guitar player a plurality of similar fret control mechanisms each independently controlled by a cupped top key mounted in the key board, and the keys arranged in rows in the said key board so that each row contains the keys associated with mechanisms controlling one string of the guitar and so that the keys as arranged in said rows will consecutively control the respective fret contacts on the fretted finger board of a guitar, and a special cupped top key in the key board, with each row of fret control keys, that controls the releasing of a horizontal locking member that provides the means for locking the fret contacts made on a respective string of a guitar.

3. In a mechanical guitar player independent fret contactor mechanisms arranged so that respective fret contacts may be made independently on each string of the guitar, and each contactor mechanism comprising a string pressing lever, provided with a rubber contactor, that is actuated by a vertical member carried by a member pivotally mounted on a horizontal fulcrum member, that is operatively controlled by a cupped top key located in the key board, and a flanged end on the member pivotally mounted on the horizontal fulcrum member that is adapted to push back and lock under a horizontal locking member when said key is depressed and a fret contact made.

4. The combination in a mechanical guitar player of string plucking wheels provided with plucking teeth, means for rotating said wheels and means for controlling their forward movement when rotated and means for controlling their backward movement after being rotated forward and released, a support holding the whole device movable to or from the strings of the guitar, and means for adjusting the distance of the whole device from the strings of the guitar so as to pluck the strings of the guitar with the plucking pressure desired.

5. In a mechanical guitar player a string plucking mechanism as set forth in claim 4 where the actuating member comprises a lever provided with a bracket that is adapted to be actuated by the knee of a human player, and means provided so that the said lever will actuate any one, any two or all three plucking wheels associated with the treble strings of the guitar at the same time.

6. In a mechanical guitar player the combination of the string plucking mechanism as set forth in claim 4 with actuating means controlled by the fret contactor keys associated with the bass strings of the guitar for operating the plucking wheels that pluck the bass strings of the guitar.

7. In combination in a mechanical guitar player, a key board, keys mounted therein and arranged in parallel rows and adapted to be depressed by contactors carried by devices secured to the shoes of a human being, means controlled by the keys for making locked fret contacts on the respective strings of a guitar, and automatic means for releasing the fret contact on any string of a guitar as another fret contact is made on the same string, and special keys for controlling the releasing of any fret contact made on the respective strings of the guitar, and means controlled by a lever, that may be operated by the arm of a human being, that releases any fret contacts made on the treble strings of the guitar at the same time, and means controlled by a lever, that may be actuated by the knee of a human being, that plucks the treble strings of the guitar inwardly, and means operative by the depressing of fret control keys, associated with the bass strings that plucks the bass strings of the guitar inwardly.

WILLIAM M. HALLBAUER.